United States Patent [19]

Nikolai, Jr. et al.

[11] 3,886,259

[45] May 27, 1975

[54] PROCESS FOR MINERAL REFINING

[75] Inventors: William L. Nikolai, Jr., Platteville, Wis.; Thomas D. Wheelock, Ames, Iowa

[73] Assignee: Iowa State University Research Foundation, Inc., Ames, Iowa

[22] Filed: July 17, 1972

[21] Appl. No.: 272,353

[52] U.S. Cl. .............. 423/166; 423/167; 423/320; 423/438; 423/391; 423/481
[51] Int. Cl. ...... C01f 1/00; C01f 5/00; C01f 11/00; C01b 25/16
[58] Field of Search ............ 423/317–321, 423/166, 167, 437, 438, 481, 482, 390, 391

[56] References Cited
UNITED STATES PATENTS
| | | | |
|---|---|---|---|
| 86,881 | 2/1869 | Tait | 423/523 |
| 1,696,471 | 12/1968 | Christensen | 423/482 |
| 3,391,996 | 7/1968 | Van Dijk | 423/320 |

FOREIGN PATENTS OR APPLICATIONS
| | | | |
|---|---|---|---|
| 630,657 | 11/1961 | Canada | 423/438 |

*Primary Examiner*—Oscar R. Vertiz
*Assistant Examiner*—Gregory A. Heller
*Attorney, Agent, or Firm*—Fitch, Even, Tabin & Luedeka

[57] ABSTRACT

A process for refining inorganic salts of an inorganic acid which is displaceable by sulfuric acid, such as phosphate and carbonate minerals like apatite and dolomite. In the process, an aqueous reaction mixture is provided comprising the salt and an aqueous reaction medium, and sulfur dioxide and oxygen are introduced into the aqueous medium. The salt, sulfur dioxide and oxygen are reacted in the aqueous medium to release the inorganic acid and to convert the inorganic salt to the corresponding inorganic sulfate.

5 Claims, No Drawings

PROCESS FOR MINERAL REFINING

This invention relates to a process for treating certain inorganic salts, and more particularly, relates to a process for refining such materials in an aqueous reaction medium through the use of sulfur dioxide and oxygen, to provide inorganic sulfates and to release the anions of the inorganic salts. The process has particular application for mineral refining and processing.

Conventional mineral technology is generally concerned with the separation, conversion, refinement and extraction of mineral materials and their components to provide useful raw and finished materials for industrial and other use. Known methods of refining and separating the components of non-sulfate mineral salts have various disadvantages and limitations which are overcome by the present invention.

It is known to treat some abundant carbonate minerals with heat or strong, concentrated acids such as hydrochloric or sulfuric acid, to effect thermal decomposition, or conversion to mineral chlorides or sulfates. For example, as disclosed in U.S. Pat. No. 3,116,974, it is known to calcine the mineral dolomite to drive off the anionic moiety (as carbon dioxide) leaving a mixture of calcium and magnesium oxides which may be slaked to provide a mixture of calcium hydroxide, magnesium hydroxide and magnesium oxide. This mixture may be selectively solubilized by means of an acid such as hydrochloric acid to provide a soluble calcium salt such as calcium chloride which is easily separated from the remaining magnesium oxide and hydroxide solids. Although efficient and useful, such processes for refining carbonate minerals which employ a calcination step, have a significant disadvantage in requiring the expenditure of large amounts of thermal energy, and usually require a cheap and readily available fuel source. In addition, large amounts of acid are required.

It is also known to treat mineral salts directly with strong acids to effect release of the anionic moiety and separation of components. For example, apatite [$Ca_5F(PO_4)_3$] is conventionally treated with concentrated sulfuric acid to provide either the superphosphate useful as a fertilizer, or a mixture of phosphoric acid and calcium sulfate which is separated by settling and filtration.

However, conventional processes involving treatment of such minerals with sulfuric acid have various disadvantages. One disadvantage inheres in the use of sulfuric acid itself rather than a raw material such as sulfur dioxide. For example, conventional apatite rock fertilizer plants are required to either ship in sulfuric acid or to have as an adjunctive facility a costly and complete sulfuric acid manufacturing plant, which may require a capital outlay about equivalent to that of the apatite treatment operation. In addition, there are other difficulties involving the direct use of concentrated sulfuric acid for refining minerals. For example, in the commercial treatment of apatite with sulfuric acid, uneconomical limitations relating to conditions required for formation of filterable crystals of calcium sulfate (usually of the dihydrate) may be encountered. Another disadvantage is that the conventional treatment of apatite with sulfuric acid may liberate dangerous and corrosive hydrogen fluoride and fluosilicic acid.

In view of the disadvantages of such known, commercial methods, a process for refining inorganic salt materials such as phosphate and carbonate minerals, to provide the corresponding inorganic sulfates and to release the anions of such materials, which would employ sulfur dioxide raw material rather than sulfuric acid, would be very desirable. However, prior art processes, for example the process of U.S. Pat. No. 1,356,907 to Collings et al., employing sulfur dioxide in the manufacture of inorganic sulfates from minerals have been limited in their application to basic mineral oxides and hydroxides. The weakly acidic sulfur dioxide will readily react with the hydroxides to form sulfite and bisulfite solutions which may then be subsequently converted to sulfates by oxidation, with loss of sulfur dioxide in the case of previous bisulfate formation. Since mineral salts do not readily react with sulfur dioxide in this manner, calcination of appropriate mineral salts such as carbonate minerals, despite its disadvantages, has been employed to convert them to basic oxides and hydroxides so that such processes may be used.

A process for refining phosphate and carbonate minerals which would utilize sulfur dioxide as a raw material would be efficient and useful, particularly for processing mineral deposits having a convenient source of sulfur dioxide.

In addition, a process which would be capable of providing calcium sulfate in its crystalline, dihydrate form would be very desirable, as would such a process, as applied to the treatment of apatite, which would not release corrosive hydrogen fluoride or fluosilicic acid. A mineral treatment process which does not involve a calcination step would also be very desirable.

It is a principal object of this invention to provide a process for refining abundant inorganic salt materials such as phosphate and carbonate minerals, which process will yield the corresponding sulfates and release the anionic moiety of the salt material. An additional object is the provision of a process for separating and refining the components of phosphate and carbonate minerals in an aqueous medium, which involves the addition and aqueous-phase reaction of sulfur dioxide and oxygen. It is a further object to provide a source of calcium sulfate from calcium-containing phosphate and carbonate minerals such as apatite and dolomite. An additional object is to provide a process for the production of filterable crystalline calcium sulfate, such as the dihydrate. Another object is the provision of a process for refining apatite which does not release corrosive hydrogen fluoride or fluosilicic acid ($H_2SiF_6$). Yet another object is the provision of a mineral refining process which does not require a prior calcination step, and which permits the recyclic use of strong acids used for refining minerals, such as hydrochloric acid.

The present invention is generally directed to a process for refining an inorganic salt of an inorganic acid which is displaceable by sulfuric acid. The process comprises the steps of providing an aqueous reaction mixture comprising the salt and an aqueous reaction medium, introducing sulfur dioxide and oxygen into the aqueous reaction medium, and reacting the inorganic salt, the sulfur dioxide and the oxygen in the aqueous reaction medium to release the inorganic acid from the inorganic salt and to convert the inorganic salt to the corresponding inorganic sulfate.

The process is particularly advantageous for refining phosphate minerals, carbonate minerals, and water soluble inorganic salts of cations which have water insoluble sulfates. The terms phosphate mineral and carbonate mineral refer to minerals comprising one or more metallic cations and one or more phosphate or carbonate anions. Phosphate and carbonate minerals are readily refined by the process, and the phosphoric and carbonic acids are readily released. In the case of the phosphate minerals, the phosphate anions will generally be released as phosphoric acid, while in the case of carbonate minerals, the process generally provides carbon dioxide gas, which may be regarded as carbonic acid anhydride.

The phosphate anions may also be in the form of condensed phosphates such as the polyphosphates and the metaphosphates. Specific examples of suitable phosphate minerals are amblygonite $[AlPO_4.LiF]$, apatite $[CaF_2.3Ca_3P_2O_8]$, autunnite $[CaO.2UO_3.P_2O_5.8H_2O]$, beryllonite $[NaBePO_4]$, cacoxenite $[FePO_4.Fe(OH)_3 4-1/2H_2O]$, herderite $[CaPO_4.BeFOH]$, monazite $[(Ce, Nd, Pr, La) PO_4+Th_3(PO_4)_4]$, monetite $[HCaPO_4]$, newberyite $[HMgPO_4.3H_2O]$ spyromorphite $[PbCl_2.3Pb_3(PO_4)_2]$, stengite $[FePO_4.2H_2O]$, triphylitelithiophyllite $[Le(Fe,Mn)PO_4]$, variscite $[AlPO_4.2H_2O]$, vivianite $[Fe_3(PO_4)_2.8H_2O]$ and wavellite $[4AlPO_4.2AL(OH)_3.9H_2O]$.

Specific examples of suitable carbonate minerals are aragonite and calcite $[CaCO_3]$, azurite $[2CuCO_3.Cu(OH)_2]$, dolomite $[CaCO_3.MgCO_3]$, gay-lussite $[CaCO_3.Na_2CO_3.5H_2O]$, lanthanite $[La_2(CO_3)_3.9H_2O]$, leadhillite $[Pb(OH)_2.PbSO_4.2PbCO_3]$, magnesite $[MgCO_3]$, malachite $[CuCO_3.Cu(OH)_2]$ and siderite $[FeCO_3]$.

Specific examples of water soluble salts having corresponding water insoluble sulfates are calcium chloride and calcium nitrate.

In accordance with the invention, an aqueous reaction mixture comprising the inorganic salt and an aqueous reaction medium is provided for processing of the inorganic salt.

The inorganic salts are considered to be processed in an aqueous reaction mixture when they are dissolved in, suspended in, immersed in, or otherwise contacted by water which is in the liquid phase. The aqueous reaction medium may contain other components in addition to the water. For example, the present invention contemplates recyclic use of the aqueous reaction medium for successive batches of inorganic salt. Accordingly, the aqueous reaction medium may contain the inorganic acids such as phosphoric, hydrochloric or nitric acids released by the refining of the previous batches in the aqueous reaction medium. Inorganic salts which are water soluble, such as calcium chloride, should be completely dissolved in the aqueous reaction medium prior to or during treatment with sulfur dioxide and oxygen. Although inorganic salts of intermediate water solubility might be completely dissolved in the aqueous reaction medium, it is usually advantageous to reduce the volume of the aqueous reaction medium used for the treatment of the mineral by suspending, immersing or otherwise contacting the mineral with an insufficient amount of water to completely dissolve it at the selected conditions of temperature and pressure. However, most of the minerals useful herein have such low water solubilities that they are considered water-insoluble, and are provided in the aqueous reaction mixture in the solid state rather than in solution.

It should be noted that when the minerals are processed in the aqueous reaction medium in the solid state, that the refining rate is generally affected by the size of the mineral solids. Generally, the smaller the size of a mineral solid, the more rapid will be the progress of its treatment. The selection of the size of the mineral solids will depend upon various factors, such as the relative economy and ease of breaking up, grinding or powdering the mineral, the scale and size of the mineral processing operation, the degree of susceptibility of the particular mineral to the process of this invention, and the selected conditions of catalyst, pressure, temperature, and sulfuric acid concentration in the aqueous reaction medium. Generally, for large scale commercial mineral processing, it is preferred that the mineral be broken up into pieces having a largest linear dimension of less than two centimeters. Of course, finer subdivision, for example such that the mineral is capable of passing through a size 80 or even a size 200 or smaller sieve of the U.S. Sieve Series will generally facilitate more rapid mineral processing, and will more readily permit continuous, slurry-type operations. Particular minerals to be treated by this process in the solid state may not require such fine subdivision, while other minerals which are treated only with difficulty should preferably be of the smaller particle size in order to facilitate their rapid processing. If the mineral is of small enough particle size, it may be slurried or suspended in the aqueous reaction medium during processing with sulfur dioxide and oxygen by some means such as by constant agitation of the aqueous medium. Alternatively, the solid mineral may simply be immersed in the aqueous reaction medium in a suitable reaction vessel or tank, or otherwise contacted by it such as by recycle spraying of the aqueous reaction medium through a porous bed of the mineral.

In the process, sulfur dioxide and oxygen are introduced into the aqueous reaction medium. The sulfur dioxide may be provided and introduced into the aqueous medium for the treatment of the mineral by any suitable method. For example, sulfur dioxide provided by burning elemental sulfur, through the roasting of sulfide minerals, or from the reductive decomposition of sulfates such as described in U.S. Pat. No. 3,087,790 to Wheelock et al., may be introduced into the bottom of a reaction vessel containing the aqueous reaction mixture so that it passes through the aqueous reaction medium. Or, sulfur dioxide may be introduced under pressure into the chamber of a pressurized reaction vessel which contains the aqueous reaction mixture.

Oxygen may similarly be provided and introduced into the aqueous medium by any suitable method. In various embodiments of the process, pure oxygen is introduced into the aqueous reaction medium with the sulfur dioxide. In other embodiments, the oxygen is supplied in admixture with other gases. In this regard, air is an economical source of oxygen, and in various embodiments of the process, the introduction of air into the aqueous reaction medium is a particularly preferred manner to introduce the oxygen required by the process.

The amount and rate of introduction of sulfur dioxide and oxygen into the aqueous reaction medium may depend on the type of mineral to be treated, and the conditions of temperature, catalyst, and reaction pressure. Of course, at least one mole of sulfur dioxide and one half mole of oxygen must be provided for each mole of sulfate ions in the inorganic sulfate product of the process. However, excess sulfur dioxide, oxygen or both may be introduced to achieve additional benefits of this invention for particular minerals. For example, as hereinafter described, the oxidation state of iron cations may be controlled in this way. It is helpful, particularly at atmospheric pressure, to introduce these reactant gases by sparging into the bottom of the aqueous reaction medium in the form of fine bubbles through the use of suitable gas-dispersing means.

When the sulfur dioxide and oxygen are introduced directly into the aqueous reaction medium, as by sparging, the sulfur dioxide and oxygen or air should best be well mixed before such introduction. Ordinarily, the introduction of sulfur dioxide and oxygen is continued until sufficient amounts of these reactants have been introduced and reacted to provide substantially complete release of the sulfuric acid-displaceable anions of the inorganic salts.

Some inorganic salts, depending upon their chemical and/or physical properties, are readily reactive and require little, if any, sulfur dioxide and oxygen beyond that necessary to provide the sulfate moiety of the inorganic sulfate product. However, some minerals which react with less facility may best be treated in aqueous reaction media which contain substantial amounts of sulfuric acid, such as above about 10% by weight or more. If it is desired to provide and maintain a particular concentration of sulfuric acid in the aqueous reaction medium, that concentration may first be provided by the introduction and aqueous phase oxidation of a sufficient amount of sulfur dioxide to provide the desired concentration of sulfuric acid, followed by the introduction of a sufficient amount of sulfur dioxide and oxygen to replace that used up as the mineral is processed at the selected conditions of temperature and pressure.

In accordance with the present process, the inorganic salt, the sulfur dioxide and the oxygen are reacted in the aqueous reaction medium to release the displaceable inorganic acid from the inorganic salt, and to convert the inorganic salt to the corresponding inorganic sulfate.

While it is possible that the reaction might be carried out to some extent at atmospheric pressure merely by the introduction of sulfur dioxide and oxygen, it is generally unacceptably slow for commercial refining, particularly for phosphate or carbonate minerals. Thus, the process should be facilitated by catalysts, superatmospheric pressure or by both. The reaction should also be carried out at elevated temperatures above ambient temperature. Useful catalytic materials for the reaction are those compounds which are catalysts for the aqueous phase oxidation of sulfur dioxide. Examples of such catalysts are inorganic iron and manganese compounds such as iron and manganese sulfates, and compounds of rare earths such as cerium.

However, these specific catalysts may tend to lose their catalytic activity as moderately strong sulfuric acid solutions, such as above about 20 percent by weight, are formed by the continued introduction and oxidation of sulfur dioxide in the aqueous reaction medium. Accordingly, they are not capable of, or have reduced capability for, providing concentrated sulfuric acid solutions. As the processing of minerals which react with difficulty, for example due to chemical composition, mineral size, silicious or other impurities, or thermal history may benefit from relatively high concentrations of sulfuric acid in the aqueous reaction medium (e.g. to provide sufficiently rapid mineral treatment for economical operation), the use of more effective catalysts may be desirable. In this regard, oxides of nitrogen, particularly higher oxides such as nitrogen dioxide, nitric acid, and salts of nitric acid such as manganous nitrate and ferric nitrate, have been found to be particularly preferred catalysts for the aqueous reaction of inorganic salt, sulfur dioxide and oxygen in the aqueous reaction medium. These preferred catalysts not only provide for more rapid reaction of the inorganic salt, sulfur dioxide and oxygen, but also permit the attainment of very high concentrations of sulfuric acid in the aqueous reaction medium through the continued introduction and reaction of sulfur dioxide and oxygen. Through the use of such catalysts, sulfur dioxide and oxygen may be rapidly added to and reacted in the aqueous reaction medium, even at atmospheric pressure. Catalysts are preferably used in amounts of about 0.5 percent, based on the weight of the water in the aqueous reaction medium. However, larger amounts may certainly also be used, and amounts as low as 0.1 percent, or even lower can provide catalytic enhancement of the process. It should be noted that many of the phosphate and carbonate minerals or other materials which may be processed by means of this invention either contain catalytic impurities, or may be catalysts themselves. For example, deposits of wavellite [$4ALPO_4 \cdot 2AL(OH)_3 \cdot 9H_2O$] may contain up to 8 percent by weight of iron oxide. However, even though in such cases catalysts may be present in the aqueous medium without separate addition, it may be beneficial to add additional catalysts, particularly the preferred nitrogen oxide, nitric acid, or nitrate salt catalysts.

Elevated pressures are also useful to facilitate mineral processing and the rate at which sulfur dioxide and oxygen may be introduced and reacted in the aqueous reaction medium. In addition, employing superatmospheric pressures facilitates the use of elevated temperatures. In this regard, reaction pressures of about 30 psig or more are beneficial, particularly in combination with oxidation catalysts. Conducting the process at pressures of about 150 psig or more, both with and without added catalysts, has provided particularly favorable results with respect to reaction velocity and mineral processing rate.

As noted, the reaction should generally be carried out at an elevated temperature, which is preferably in excess of about 50°C. The reaction is best conducted at a temperature of between about 65°C. and about 95°C., with 70°C. to 95°C. being a preferred range for operation under pressure.

An oxidation catalyst and an elevated pressure and temperature are preferably used in combination in order to achieve maximum benefits and processing rate, except where particular economic considerations might limit processing to atmospheric-pressure equipment.

The reaction of the inorganic salt, sulfur dioxide and oxygen serves to convert the salt to the corresponding inorganic sulfate and to release the displaceable inorganic acid from the inorganic salt. If the inorganic sulfate and the released inorganic acid are both water soluble, they may be readily separated from insoluble impurities such as silica originally present in the salt by sedimentation or filtration. For example, processing of an impure variscite [$AlPO_4 \cdot 2H_2O$] will provide a solution of aluminum sulfate and phosphoric acid which is easily separated by sedimentation and filtration from silicious or other insoluble impurities. As an additional example, which also demonstrates the control of the oxidation state of a mineral cation, vivianite [Fe$_3$(PO$_4$)$_2$.8H$_2$O] may be reacted in an aqueous medium with sulfur dioxide and only a sufficient amount of oxygen or air for conversion to a solution of ferrous sulfate and phosphoric acid. This solution may be separated from insoluble impurities and the ferrous sulfate-phosphoric acid solution may be subsequently further oxidized to ferric sulfate if desired. The vivianite could also be initially reacted with sulfur dioxide and an excess of oxygen or air so that a solution of phosphoric acid, and ferric sulfate, would be produced directly.

Carbonate minerals will provide carbon dioxide gas which is easily or spontaneously separated from the aqueous reaction medium. For example, dolomite will generate carbon dioxide, leaving magnesium sulfate and calcium sulfate in the aqueous reaction medium.

If an inorganic sulfate provided by the process is water-insoluble, it may be readily separated from a soluble displaced inorganic acid. For example, treatment of pyromorphite [PbCl$_2$.3Pb$_3$(PO$_4$)$_2$] would provide a solution of phosphoric and hydrochloric acids which is easily separated from the insoluble lead sulfate also produced. It should be noted that particularly when the particle or unit size of a solid mineral being processed is rather large, there may be a tendency for the insoluble sulfate product to coat the mineral being processed, thereby possibly retarding the refining process. Under such circumstances it may be desirable to agitate and abrade the mineral, for example, by stirring, in order to provide constantly fresh reaction surfaces.

A particularly advantageous feature of the present invention is that the insoluble sulfates, such as calcium sulfate, may be provided in easily filterable crystalline form from inorganic salts, such as apatite, which are calcium salts of displaceable acid. In this regard, for example, calcium sulfate dihydrate may be readily provided as a reaction product in the form of relatively large, easily filterable parallelogram-shaped crystals having a length of about two or three times their width.

The following Examples illustrate various aspects of the present invention.

EXAMPLE 1

Apatite [Ca$_5$F(PO$_4$)$_3$], which naturally contains very minor amounts of catalytic impurities including rare earths, iron, and manganese, is ground so that it is capable of passing through a size 80 sieve of the U.S. Sieve Series. 75 grams of ground apatite, 425 grams of water and 4 grams of ferric nitrate catalyst are placed in a 1 liter pressure reactor and the reactor sealed. Conversion of the 75 grams of apatite (0.15 mole) requires about 0.625 mole of SO$_2$. At 70°C. and 130 psig, the head space of this reactor contains only about 0.2 mole of SO$_2$, but adequate SO$_2$ dissolves under these conditions in the aqueous reaction medium to provide for the remainder necessary for conversion. The temperature is raised to 70°C. and the reactor charged with sulfur dioxide to 130 pounds per square inch. Oxygen is added to keep the total pressure in the reactor at 200 pounds per square inch. The temperature is allowed to rise to 85°C. during the reaction. The apatite is substantially reacted within 15 minutes but an additional 15 minutes is allowed for digestion and lowering of the temperature to 70°C. The products of the reaction are readily filterable crystalline calcium sulfate dihydrate, calcium fluoride, and phsphoric acid, along with some other insolubles. The calcium sulfate phosphoric are relatively large, parallelogram-shaped platelets (with missing corners) having a length to width ratio of about 2 or 3. Some of the individual crystals are visible to the naked eye. The calcium sulfate, calcium fluoride, and insolubles are separated from the phosphoric acid by filtration to provide a dilute solution of phosphoric acid. The residue of insolubles is wahsed with water and the wash water combined with the phosphoric acid solution, so that losses of phosphoric acid are minimized to less than 1 percent by weight. The dilute phosphoric acid solution may be concentrated by recycling, i.e., used in the aqueous reaction medium for successive batches of apatite.

EXAMPLE 2

75 grams of ground apatite and 425 grams of 25 percent by weight phosphoric acid which contains 1 percent by weight ferric nitrate are placed in a one liter reaction vessel fitted with a gas-dispersing inlet port on the bottom of the vessel and a mechanical stirring device. The stirring device is activated and the temperature is raised to about 70°C. and maintained at that temperature. Sulfur dioxide and air are fed at atmospheric pressure into the reactor so that the molar ratio of sulfur dioxide to oxygen is maintained at about 2:1 or slightly less. In this connection, sulfur dioxide at a rate of .100 cc. per minute and air at a rate of 300 cc. per minute are mixed and sparged through the gas inlet port at the bottom of the reaction vessel, while the stirring disperses the gas bubbles in the slurry. The reaction proceeds without liberating corrosive hydrogen fluoride or fluosilicic acid. The reaction is continued in this manner for several hours until the apatite is completely reacted. In this regard, the course of the reaction is followed with pH measurements, and is terminated when the pH drops below 0.5, indicating the presence of more than 0.1 normal H$_2$SO$_4$ free in the aqueous reaction medium.

The solids are then separated by filtration from the solution containing the phosphoric acid. The solids, consisting mainly of crystalline calcium sulfate dihydrate and calcium fluoride, are washed with water previously used for scrubbing gases exiting from the reactor. This wash water is subsequently used to make up water for the aqueous reaction medium for the next batch of apatite to keep losses within the system.

Alternatively, the refining of apatite as described in this example is carried out by starting with 75 grams of ground apatite in 400 grams of water containing 1 to 2 percent by weight nitric acid or ferric nitrate.

EXAMPLE 3

A series of runs are conducted at atmospheric pressure in the apparatus of Example 2. In these runs, 75 grams of the ground apatite of Example 2 is placed in the reaction vessel with 425 grams of various aqueous reaction media as follows:

a. water,
b. 10% by weight nitric acid solution,
c. 20% by weight phosphoric acid, 10% by weight nitric acid solution.

Ferric nitrate (4 grams), manganous sulfate (4 grams), nitrogen dioxide, or the nitric acid (in the case of the nitric acid solutions) may serve as catalysts. The stirring device is activated and the temperature is raised to 85°C. if necessary. Sulfur dioxide and air are fed into the gas inlet port at a ratio of about 2:5 or slightly less. The time for the reaction to be complete for each run depends upon the rate of addition of the sulfur dioxide and air, the catalyst used, the temperature, and the nature of the aqueous reaction medium used. For example, for the run using the 10 percent nitric acid solution, at 85°C, and with a rate of introduction of $SO_2$ and air of 350 cc. per minute (250 cc./min., of air, 100 cc./min. of $SO_2$), the reaction is complete in about 1 hour.

In all runs, the solids are readily separated by filtration from the solution containing the phosphoric acid produced during the reaction. The solids, consisting mainly of crystalline calcium sulfate dihydrate, silica, and calcium fluoride are washed with water and the wash water is used for scrubbing gases exiting from the reaction vessel in successive runs to recover any nitrogen dioxide or sulfur dioxide which might be lost otherwise and may also be used as make up water for successive runs to keep losses within the system.

EXAMPLE 4

Dolomite [$CaCO_3$, $MgCO_3$] is ground so that it is capable of passing through a size 80 sieve of the U.S. Sieve Series. 22 grams of this ground dolomite and 400 grams of water are charged into a 1 liter pressure reaction vessel. 5 grams of ferric nitrate are then added to the reaction vessel. The vessel is sealed, heated to about 85°C and charged with sulfur dioxide so that the vessel is pressurized at a pressure of 100 pounds per square inch. Oxygen is then introduced into the reaction vessel at a rate sufficient to maintain the vessel pressure at 350 pounds per square inch. After 30 minutes no additional oxygen is required to maintain the pressure at 350 pounds per square inch and the reaction is completed when the pH drops below 0.5. The reaction vessel pressure is slowly released by allowing the escape of oxygen and carbon dioxide from the head space of the reaction vessel into a carbon dioxide recovery system.

The contents of the reaction vessel are emptied into a tank filled with a stirrring mechanism and allowed to digest for an hour at less than 70°C. The digested mixture of solids and liquids is separated by filtration. The solid phase is washed with 50 grams of water. The wash water is sent back to the reaction vessel to make up aqueous reaction medium for the next batch of dolomite. The residue consists mainly of calcium sulfate in the crystalline dihydrate form [$CaSO_4.2H_2O$] with some silica and other insolubles. For dolomite limestone containing 90 percent dolomite the filtrate would contain about 0.2 moles of magnesium sulfate per liter of solution. For recycle operation, 350 grams of the magnesium sulfate solution is returned to the reaction vessel and combined with the wash water to make up the aqueous reaction medium for the next batch. The 50 grams of remaining filtrate is processed for recovery of the magnesium content. The advantage of this technique, when scaled up for industrial production, is that after a finite number of recycle steps the magnesium sulfate concentration is increased to a desirable and practical concentration for further processing and only a small fraction of catalyst need be added to the system after start up. Also, losses of $MgSO_4$ are minimized by keeping them confined to the system. This example demonstrates the direct conversion of dolomite into calcium and magnesium sulfates and the ready separation of these sulfates. The conversion of dolomite of this example into calcium and magnesium sulfates is complete, and is accomplished without the necessity for the prior calcination of the mineral.

EXAMPLE 5

Naturally occurring wavellite [$4AlPO_4.2Al(OH)_3.9H_2O$] is ground so that it is capable of passing through a size 80 sieve of the U.S. Sieve Series. The mineral naturally contains about 8 percent by weight $Fe_2O_3$ and about 9% CaO as impurities. 50 grams of this ground wavellite and 425 grams of water containing 5 grams of concentrated nitric acid are placed in a reaction vessel fitted with a gas-dispersing inlet port on the vessel bottom and a mechanical stirring device. Sulfur dioxide, at a rate of 100 cc. per minute and air at a rate of 250 cc. per minute are introduced at atmospheric pressure through the gas inlet port with continuous mechanical stirring and reacted at a temperature maintained between 70°C. and 80°C. The stirring and sulfur dioxide-air addition are continued for up to several hours with the progress of the reaction being monitored by pH measurement. The flow of sulfur dioxide is then reduced to 50 cc. per minute while the rate of air flow remains unchanged so that any ferrous sulfate is oxidized to ferric sulfate. The air and sulfur dioxide flow are then stopped and a solution containing aluminum sulfate and phosphoric acid is recovered by filtration from an insoluble residue of calcium sulfate and silicious impurities.

EXAMPLE 6

75 grams of powdered malachite [$CuCO_3.Cu(OH)_2$], and 425 grams of water containing 5 grams of ferric nitrate are placed at about 50°C. in a reaction vessel fitted with a gas inlet port on the vessel bottom, a mechanical stirring device, and a pressure vent. Sulfur dioxide at a rate of 10 cc. per minute and air at a rate of 70 cc. per minute are introduced through the gas inlet port with continuous mechnical stirring, and the pressure is maintained at about 150 psig by bleeding gases (mainly nitrogen and carbon dioxide) from the vessel by means of the valve. Upon completion of the reaction, a solution of copper sulfate is provided.

EXAMPLE 7

300 grams of a 25 percent solids slurry consisting of 75 grams of ground dolomite and 225 grams of water are placed in an open-topped glass reactor vessel having a gas-dispersing inlet port on the vessel bottom and a stirring mechanism. Nitrogen dioxide is then introduced through the inlet port and bubbled through the slurry for several minutes at room temperature. After discontinuing the flow of nitrogen dioxide, sulfur dioxide and oxygen are then mixed and fed with stirring through the inlet port at a molar ratio of 1 to 1 and at a total flow rate of 200 cc. per minute. The temperature of slurry immediately begins to rise as the sulfur dioxide is oxidized in the aqueous medium, and crystals of calcium sulfate dihydrate are soon visible in the slurry. The temperature of the reaction vessel is kept below 70°C. by cooling, if necessary, to promote the formation of calcium sulfate dihydrate. After about ½ hour the molar ratio of sulfur dioxide to oxygen is changed to 2:1 ($SO_2:O_2$) while maintaining a total flow rate of 200 cc. per minute of the mixed gases through the inlet port. After about an hour the pH of the aqueous reaction medium in the reaction vessel is about 1.5, and the flow of gases is terminated after about 2 hours. The reaction vessel contains a solution of magnesium sulfate and sulfuric acid, and an insoluble precipitate of chiefly calcium sulfate dihydrate. Alternatively, the reaction of this example can be carried out by using air as a source of oxygen and continuously mixing a catalytic amount of nitrogen dioxide with the sulfur dioxide and oxygen, or using another highly effective catalyst such as ferric nitrate, manganous nitrate or nitric acid.

EXAMPLE 8

Two separate reactions are carried out which are similar except that a different mineral is refined in each. The minerals refined are, respectively, variscite [$AlPO_4.2H_2O$] and monetite [$HCaPO_4$]. 10,000 pounds of each mineral, which has been broken up so that it is capable of passing through a screen with one-half inch openings, are respectively placed in separate 2500 gallon reactors, along with 50 pounds of ferric nitrate, and 1,000 gallons of water. Sulfur dioxide and air at a ratio such that the molar ratio of sulfur dioxide to oxygen is 2:1.5, are slowly introduced into the reactors and reacted at a temperature in the range of 75°C. to 95°C. Higher temperatures, and pressures above atmospheric may also be used if desired. The exit gases are scrubbed by passing them through another water, mineral and catalyst filled reactor, and finally through a tower containing water and catalyst which will be used for succeeding batches of mineral. The variscite and monetite are converted to solutions of phosphoric acid and, respectively, soluble aluminum sulfate, and insoluble calcium sulfate.

Although it has been described in detail for the refining of carbonate and phosphate minerals, the process does have application for refining inorganic salts which have one or more metallic cations and one or more inorganic acid anions which are capable of aqueous phase displacement by sulfuric acid. For example, colemanite [$Ca_2B_6O_{11}.5H_2O$] has a borate anion which is displaceable by sulfuric acid, and refining of this mineral by the present process provides insoluble calcium sulfate and releases the borate anion of the mineral.

Water-soluble inorganic salts which have sulfuric acid-replaceable anions, particularly those for which the corresponding sulfates of the cations of the salts are water-insoluble, are very conveniently refined by the process as may be seen from the following example.

Although elevated temperatures of about 85°C. may be briefly employed, when it is desired that a calcium sulfate precipitate be in the crystalline, dihydrate form, the reaction temperature is best not permitted to exceed about 70°C. for any considerable period of time since the dihydrate produced may be converted to anhydrite above that temperature. The precise upper temperature limit for crystalline calcium sulfate dihydrate production may vary, for example as a function of phosphoric acid concentration, and should be specifically determined for the particular process application.

EXAMPLE 9

500 grams of calcium chloride solution are prepared by dissolving 100 grams of calcium chloride in 400 grams of water. This solution is placed in a 1 liter, 3 necked flask fitted with a mechanical stirrer and two glass bubbling frits extending below the surface of the solution. The stirrer is activated and sulfur dioxide is introduced into the solution at a rate of 250 cc. per minute through one frit and air is bubbled through the other frit at a rate of 750 cc. per minute. Calcium chloride from a number of sources contains sufficient iron to serve as a catalyst; however, 5 grams of nitric acid (or a trace of nitrogen dioxide introduced into the air stream) is added to further catalyze the reaction. The reaction is complete within 2 hours and the calcium chloride has been converted into crystalline, dihydrate calcium sulfate [$CaSO_4.2H_2O$]. The process is carried out at temperatures below 65°C. to promote and maintain rapid crystal growth of calcium sulfate dihydrate. The aqueous reaction medium contains the byproduct hydrochloric acid, sulfuric acid, and the nitric acid catalyst, which are readily separated from the calcium sulfate by filtration. The calcium sulfate filtrate is washed with a small amount of water about equivalent to that retained by the calcium sulfate by absorption and water of hydration, and the wash water is added to the hydrochloric acid solution.

When the reaction of Example 9 is carried out so that only enough sulfur dioxide is introduced and oxidized in the aqueous reaction medium to provide the calcium sulfate product, so that there is very little if any sulfuric acid in the aqueous medium at the termination of the reaction, the filtrate containing the displaced hydrochloric acid and catalyst can be reacted with, for example, calcite [$CaCO_3$] to release the carbonate ions as carbon dioxide, and to provide a solution of calcium chloride. The calcium chloride solution is readily separated from insoluble impurities in the calcite, and already contains the reaction catalyst for repeating the reaction described in Example 9; separation of the reaction products would provide the calcium sulfate product and would regenerate the hydrochloric acid solution for subsequent reaction with more calcite. The action cycle may be repeated indefnitely with relatively minor additions of hydrochloric acid, catalyst and water to replace that which is inadvertently or unavoidably lost from the system for one reason or another. The net result of the reaction cycle is essentially that only calcite, sulfur dioxide and oxygen are consumed, and carbon dioxide and calcium sulfate are produced. Yet the benefits of processing with hydrochloric acid, such as rapid displacement of the carbonate anion to provide a calcium chloride solution that is easily metered and transported by pumping and readily separated from insoluble impurities, are obtained without a net expenditure of hydrochloric acid. Such a process not only eliminates the need for calcining the carbonate mineral, but also provides additional benefits such as the above mentioned processability and purification.

When the cation (or cations) of the soluble, inorganic salt has a soluble sulfate, the sulfate is then readily separated from other cations having insoluble sulfates. For example, reacting magnesite [$MgCO_3$] with hydrochloric acid will provide a solution of magnesium chloride which may be processed as described in Example 11, to provide a solution of magnesium sulfate and hydrochloric acid which may be separated from insoluble sulfate impurities by filtration or sedimentation.

Mineral salts having cations which have both soluble and insoluble sulfates may also be refined and the components separated. For example, dolomite [$CaCO_3 \cdot MgCO_3$] may be reacted with nitric acid or hydrochloric acid to displace the carbonate ions and provide a solution of calcium and magnesium chlorides or nitrates. The solution may be processed to provide insoluble calcium sulfate and a solution of magnesium sulfate and hydrochloric or nitric acid. The magnesium sulfate may be recovered or removed and the acid recycled to treat more dolomite. Alternatively, a solution of calcium chloride and magnesium chloride could be reacted with only a sufficient amount of sulfur dioxide and oxygen to convert only the major portion of the calcium chloride to calcium sulfate, leaving a solution of hydrochloric acid, magnesium chloride and the small excess of calcium chloride.

Accordingly, it can be seen that the process of this invention enables the efficient recyclic use of strong acids, such as hydrochloric acid and nitric acid in mineral refining processes. In the case of carbonate minerals, this eliminates the need for calcination, and provides additional benefits and processing flexibility.

The reaction mechanism or mechanisms involved in the present invention are believed to be complex and might involve reaction schemes generally described as either more or less direct formation of the inorganic sulfate, or intermediate formation of sulfuric acid in the aqueous reaction medium followed by reaction of the sulfuric acid thus formed, with the inorganic salt. Processing of solutions of salts having cations which have insoluble sulfates can proceed with virtually no macroscopic concentration or buildup of sulfuric acid while as described hereinabove, some insoluble, difficult to process minerals may best be processed by maintaining a particular concentration of sulfuric acid in the aqueous reaction medium. In any event, inorganic salts having one or more anions which are replaceable by sulfuric acid in an aqueous reaction medium are satisfactorily refined by various embodiments of the present process.

The refining process described herein may be employed with a wide variety of minerals, plant operation techniques, and equipment. Various applications of this process for the treatment, separation, extraction, or purification of specific mineral materials will be apparent to those skilled in the art in view of this disclosure. For large mineral refining operations, the process may advantageously be operated in a continuous manner rather than in batches, to effect economies of size and mechanization.

It will also be understood by those skilled in the art that the process need not be carried out to chemical completion on any given amount of mineral. While complete displacement of phosphate and carbonate anions may be accomplished, incomplete displacement may be desired under certain circumstances.

In addition, this invention may be advantageously integrated with other processes. For example, the reductive decomposition of sulfates such as gypsum provides sulfur dioxide byproduct but uses sulfate raw material. Since the present invention provides inorganic sulfates but requires sulfur dioxide raw material, these two processes may be beneficially combined to provide efficient, recyclic use of sulfur dioxide. Other sources of sulfur dioxide, such as the petroleum and coal combustion products of commercial power plants, may advantageously be consumed thereby.

As another example of the recyclic use of strong acids enabled by the present invention, the process disclosed in U.S. Pat. No. 3,116,974 may be used to provide calcium chloride, but requires hydrochloric acid. Since the present invention may be used to refine calcium chloride to provide insoluble calcium sulfate and hydrochloric acid, these two processes, also, may be beneficially combined to provide recyclic use of hydrochloric acid in a mineral refining process.

Various of the features of the invention are set forth in the following claims.

What is claimed is:

1. A process employing the recyclic use of sulfur dioxide in the refining of an inorganic calcium material selected from the group consisting of calcium phosphate minerals, calcium carbonate minerals, calcium chloride and calcium nitrate, comprising, in combination, the steps of providing an aqueous reaction mixture comprising said inorganic material, an aqueous reaction medium, and at least about 0.5 weight percent, based on the weight of said aqueous reaction medium, of a catalyst for the aqueous phase oxidation of sulfur dioxide selected from the group consisting of nitrogen oxides, nitric acid, and ferric nitrate, introducing sulfur dioxide and oxygen into said aqueous reaction mixture, and reacting said inorganic material, said sulfur dioxide, and said oxygen in said aqueous reaction medium at an elevated pressure of at least about 30 psig and at a temperature of from about 50°C. to about 70°C. to provide a precipitate of calcium sulfate dihydrate in the form of readily filterable parallelogram-shaped crystals having a length to width ratio of from about 2 to about 3, and to release the anionic moiety of said inorganic material as phosporic acid, carbon dioxide, hydrochloric acid or nitric acid, respectively, separating said calcium sulfate precipitate from said aqueous reaction medium, reductively decomposing said calcium sulfate precipitate to provide sulfur dioxide, and subsequently reacting said sulfur dioxide produced by said reductive decomposition with oxygen and an inorganic calcium compound selected from the group consisting of calcium phosphate minerals, calcium carbonate minerals, calcium chloride and calcium nitrate in an aqueous reaction medium containing at least about 0.5 weight percent, based on the weight of said reaction medium, of a catalyst selected from the group consisting of nitrogen oxides, nitric acid and ferric nitrate, at an elevated pressure of at least about 30 psig and at a temperature of from about 50°C. to about 70°C. to provide a calcium sulfate dihydrate precipitate in the form of readily filterable parallelogramshaped crystals having a length to width ratio of from about 2 to about 3 and to release the anionic moiety of said inorganic compound.

2. A process in accordance with claim 1 wherein said inorganic material is selected from the group consisting of wavellite, apatite and dolomite.

3. A process in accordance with claim 1 wherein air is employed to supply said oxygen to said reaction.

4. A process for refining calcium carbonate minerals which employs recyclic use of hydrochloric acid, comprising the steps of reacting a calcium carbonate mineral with hydrochloric acid to provide calcium chloride, providing an aqueous reaction medium comprising said calcium chloride and at least about 0.5 weight percent, based on the weight of said aqueous reaction medium, of a catalyst for the aqueous phase oxidation of sulfur dioxide selected from the group consisting of nitrogen oxides, nitric acid, and ferric nitrate, introducing sulfur dioxide and oxygen into said aqueous reaction mixture, reacting said calcium chloride, said sulfur dioxide and said oxygen in said aqueous reaction medium at an elevated pressure of at least about 30 psig and at a temperature of from about 50°C. to about 70°C. to provide a precipitate of calcium sulfate dihydrate in the form of readily filterable parallelogramshaped crystals having a length to width ratio of from about 2 to about 3, and to displace the chloride anion of said calcium chloride to provide hydrochloric acid byproduct, separating said calcium sulfate precipitate from said hydrochloric acid byproduct, and reacting said byproduct hydrochloric acid with a calcium carbonate mineral to provide calcium chloride.

5. A process in accordance with claim 4 wherein air is employed to supply said oxygen to said reaction.

* * * * *